United States Patent

[11] 3,558,062

| [72] | Inventor | Robert O. See |
| | | Middletown, N.J. |
| [21] | Appl. No. | 774,743 |
| [22] | Filed | Nov. 12, 1968 |
| [45] | Patented | Jan. 26, 1971 |
| [73] | Assignee | Air Reduction Company Incorporated |
| | | New York, N.Y. |
| | | a corporation of New York |

[54] GAS TORCH TIP
6 Claims, 16 Drawing Figs.

[52] U.S. Cl. .................................................. 239/419.3,
239/424, 239/596, 239/600
[51] Int. Cl. ................................................. F23d 11/16
[50] Field of Search ........................................ 239/419.3,
422, 423, 424X, 600X, 596

[56] References Cited
UNITED STATES PATENTS
| 1,151,258 | 8/1915 | Fischer ......................... | 239/596 |
| 2,657,650 | 11/1953 | Chouinard et al. ........... | 239/419.3 |
| 2,881,826 | 4/1959 | Spies, Jr. ...................... | 239/600X |
| 3,390,838 | 7/1968 | Stalberger .................... | 239/432X |

*Primary Examiner*—Lloyd L. King
*Attorneys*—Larry R. Cassett, Edmund W. Bopp and H. Hume Mathews ABSTRACT: An expendable flame tip for a gas-fired torch is made separable from the gas-mixing rear portion whereby a series of different size tips may be used with a single-mixed portion and only the front end of the torch need be replaced in the event of damage to the tip. The tip portion is formed from two tubular members by inserting one such tubular member within the other and swaging them together (over mandrels if desired). The torch tip is thus manufactured without the need of the now used expensive drilling operations as the gas passageways are formed by grooves formed in the tubular members.

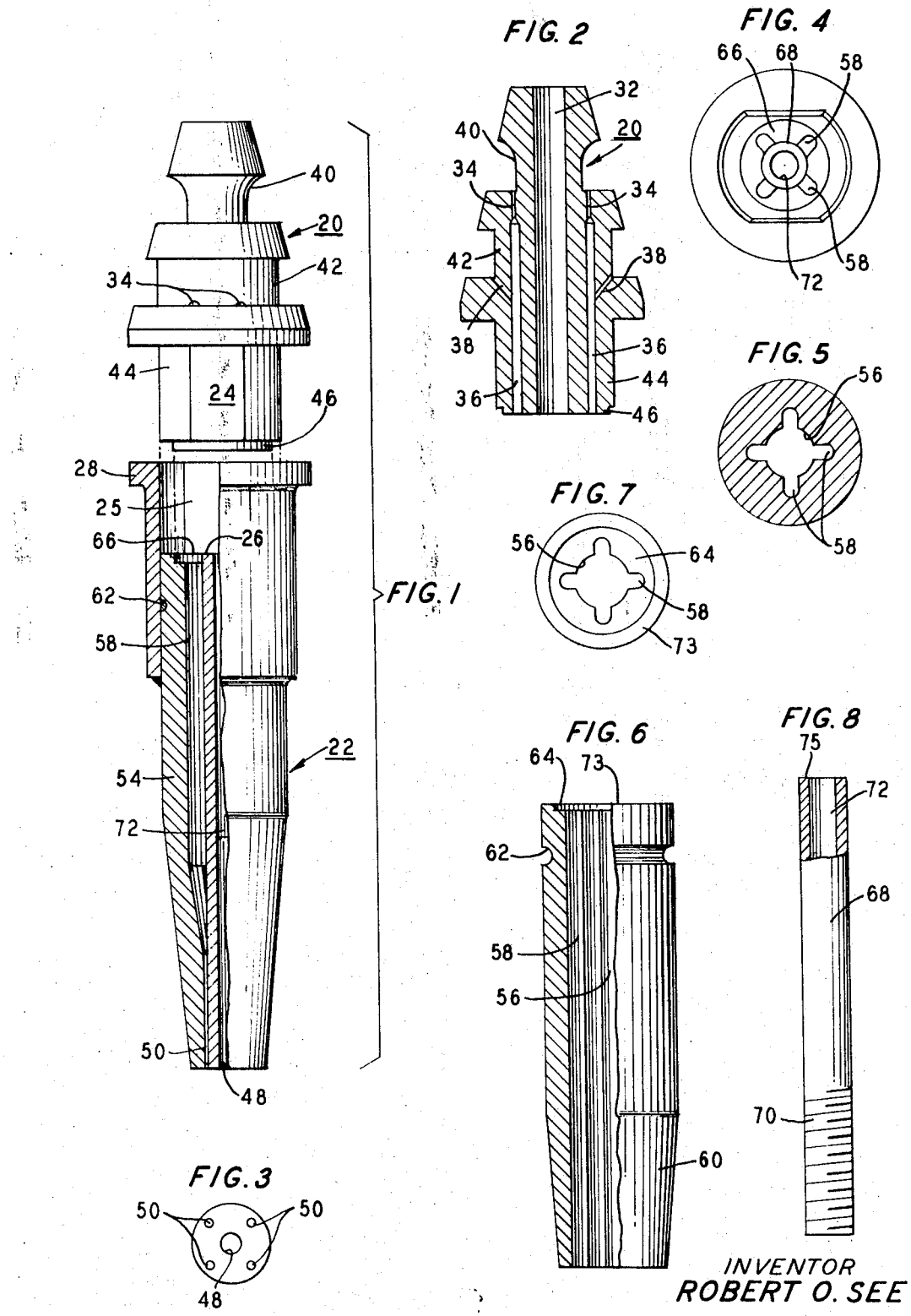

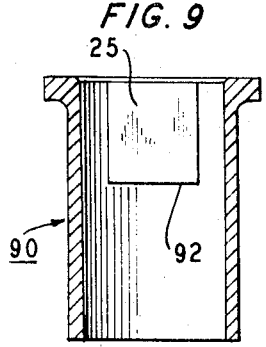
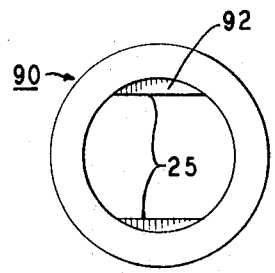
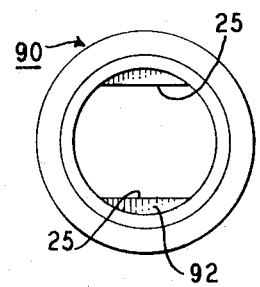
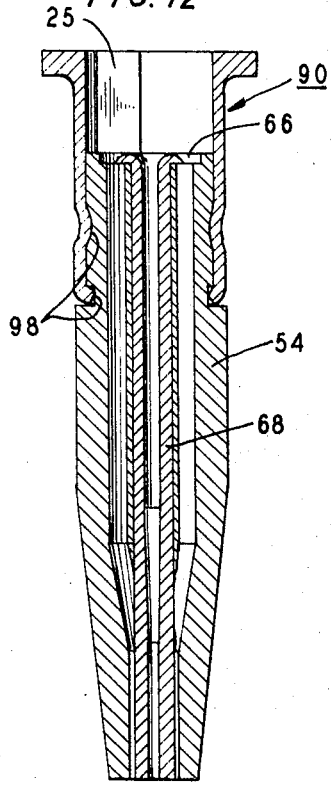
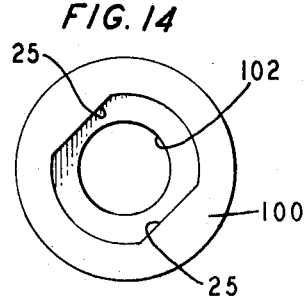
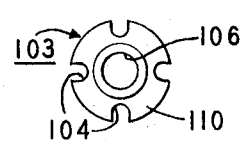
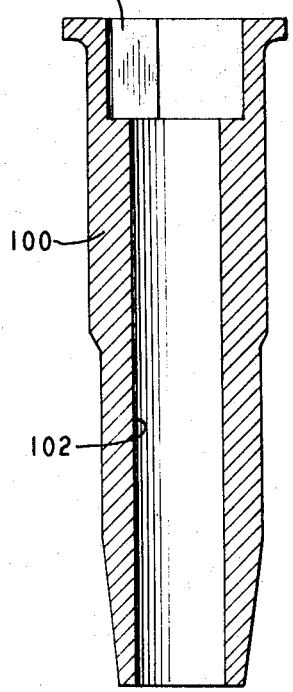
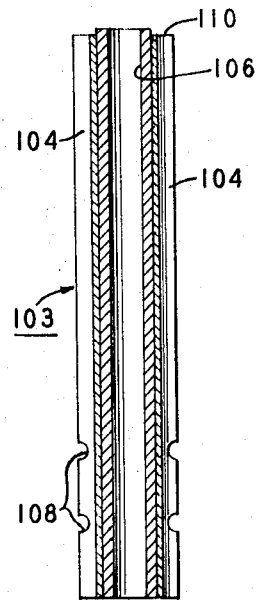

3,558,062

1
GAS TORCH TIP

BACKGROUND OF THE INVENTION

Present day torch tips generally combine two functions in a single piece. The rearward portion of the tip receives three gas supplies, namely: cutting oxygen, a fuel gas, and other oxygen that is to be mixed with the fuel gas. The forward portion of the tip contains passages for discharging cutting oxygen and for discharging the combustible mixture of fuel gas and oxygen.

Both functions require accurately formed passages, and may require precise alignment of different sized passages at the two ends of the tip. In use, the great preponderance of wear and damage occurs in the discharge end of the tip where the flame is produced.

Upon damage or wearing out of a tip, it has been necessary to discard the entire tip, even though the upper, mixing portion is usually good for a much longer period of service.

It has been found difficult and costly to drill long, straight holes in forming the tip, and to maintain peripheral holes concentric.

It is customary to swage the discharge passage walls over mandrels to bring the discharge passages down to the desired finished size. The presence of the mixing facilities in the rearward portion of the tip has interfered with introducing mandrels from the rear end of the tip. As the mandrels have, in the past, been put in and withdrawn from the flame end, tapering of the discharge holes toward that end, though desirable, has not heretofore been feasible.

Because the torch tip served both as a mixer and as a flame former, and since flame tips of a wide range of orifice sizes are found necessary for cutting different thicknesses of metal stock, it has been necessary in the past to make torch tips complete with mixer in a variety of sizes.

SUMMARY OF THE INVENTION

The torch tip made in accordance with the present invention is in two pieces, separating the functions of fuel gas mixing and flame forming. Upon damage to, or wearing out of the flame tip part, it is necessary to replace that part only.

Because of the two-piece construction, the need for drilled holes is confined to the mixer portion and the length of any one drilled hole is greatly shortened, thereby enabling the holes to be made sufficiently straight and concentric, and the hole pattern to be maintained within strict tolerances and free from burrs without excessive manufacturing costs.

The use of an insert in an outer tubular member results in that elimination of all drilling of holes in the flame tip portion, thereby permitting the use of lower priced copper (brass and other materials also are used) and faster processing, with less handling of the article during manufacture. No metal waste is produced, and savings are made in reduction of capital expense for drills and drilling machines.

Consequently, the cost of the flame tip is made so low that the flame tip is expendable, to be thrown away after a normal period of satisfactory usefulness.

The making of the flame tip as a separate component makes it possible to insert the swaging mandrels through the back of the flame tip. Consequently, the mandrel can be tapered down toward the discharge end of the flame tip. It is thus economical to produce favorable, e.g. long, tapers, both in the cutting orifice and in the preheat orifices, with consequent improvement in the operation of the torch and tip.

A further advantage obtained by separating the mixer and flame forming portions of the torch tip is that a range of flame tips of various sizes can be used with a single mixer member, thereby enabling the operator to cut various thicknesses of metal without changing the mixer member.

Another advantage is that for cleaning, the holes in the flame tip can be reamed out from the rear, thus pushing obstructing particles out through the orifice, instead of pushing them up into the tip as is the case in reaming from the front. It will be evident that the presence of the mixer structure in a one-piece torch tip usually precludes reaming from the rear end.

In order to provide precise alignment of mixer holes to flame end holes, or other desired angular relationship between said holes, the mixer and flame tip elements are keyed together in predetermined radial position. This feature assures proper balance of the flame pattern.

The mixer part as herein disclosed can be retained in the torch head by use of a retaining ring to protect both seating surfaces of the tip and torch head from damage, and a standard tip nut can be used in conjunction with a flange on the flame tip to force the flame tip to seat against the forward face of the mixer, effecting a seal.

The flame end part as herein disclosed can be used without the mixer portion in conjunction with a torch head of a type in which the mixture of fuel gas and oxygen is premixed in the torch head or torch and delivered directly to the flame tip. In this case, an adapter can be provided between the torch head and the flame tip.

BRIEF DESCRIPTION OF THE DRAWINGS

FIG. 1 is an exploded view partly in section of a two-piece torch tip constructed in accordance with the invention;

FIG. 2 is a longitudinal sectional view of the mixer portion of the two-piece tip shown in elevation in FIG. 1;

FIG. 3 is a bottom plan view of the flame portion of the tip shown in FIG. 1;

FIG. 4 is a top plan view of the flame portion of the tip shown in FIG. 1;

FIG. 5 is a cross-sectional view of an extruded tube suitable for use in forming the shell portion of end part of a torch tip in accordance with the invention;

FIG. 6 is an elevational view, partly in section, of a length of tube showing in FIG. 5 after being machined;

FIG. 7 is a top plan view of the member shown in FIG. 6;

FIG. 8 is an elevational view, partly in section of an insert member to be inserted in the shell shown in FIGS. 6 and 7;

FIG. 9 is a longitudinal sectional view of a seat socket member to be attached to the shell 54 as shown in FIG. 1;

FIG. 10 is a top plan view of the seat socket member shown in section in FIG. 9;

FIG. 11 is a bottom plan view of the seat socket member shown in section in FIG. 9;

FIG. 12 is a longitudinal sectional view of a flame end member showing alternative structure;

FIG. 13 is a longitudinal sectional view of a form of shell member differing in structure in certain respects from that shown in FIG. 6;

FIG. 14 is a top plan view of the shell member shown in section in FIG. 13;

FIG. 15 is a longitudinal sectional view of a form of insert member differing in structure in certain respects from that shown in FIG. 8; and FIG. 16 is a top plan view of the insert member shown in section in FIG. 15.

DESCRIPTION OF THE PREFERRED EMBODIMENTS

Referring to the drawings, FIG. 1 shows a torch tip in two entirely separate pieces. The two-piece tip may have the same outward form as a commonly used one-piece tip and can be clamped into the same torch head. The same clamping arrangement used with the one-piece tip serves to seat the pieces of the two-piece tip together as well as to retain and seat the tip assembly in the head.

The upper part 20 of the two-piece tip is the mixer part and serves the same purpose as, and may be substantially identical in form with, the usual mixer portion of a one-piece tip. However, the part 20 is keyed to a flame end part 22, as by one or more flat surfaces 24 matching flat surfaces 25 in a socket 26 in the tip of the part 22.

In the FIGS., the mixer end of the flame part 22 appears at the top of the drawing. The mixer end, sometimes referred as the rear end, will be referred to as the top in the following description. A flange 28 is provided at the top of the part 22 to accept pressure from the usual tip nut to bear upon mating seat surfaces of the parts 20 and 22 to hold the two pieces together in operative position when the tip is in place in the head.

The part 20, as seen in the sectional view in FIG. 2, has the usual central passage 32 for cutting or scarfing oxygen, metering ports 34 for supplying oxygen to fuel gas passages 36, and metering ports 38 for supplying fuel gas to the passages 36. The part 20 may be of usual truncated conical form to seat in the usual torch head, with the usual annular groove 42 for supplying oxygen to the metering ports 34 and the usual annular groove 42 for supplying fuel gas to the metering ports 38.

The flat 24 is made in an otherwise circular cylindrical base portion 44 and the thus keyed base portion 44 can be arranged to fit snugly into the socket 26 in part 22 shaped to mate therewith. Thus the radial position of the hole pattern of the mixer part 20 with reference to the hole pattern of the flame end portion 22 of the tip is fixed, while the two parts of the tip to be easily separated when unclamped with respect to the torch head. A circular cylindrical extension 46 of the base 44 of lesser diameter than the main portion of the base 44 forms a seat annulus when the base 44 is placed in contact with the bottom of the socket 26.

FIG. 3 shows the appearance of the bottom or flame end of the torch tip with the usual central hole 48 and a plurality of peripheral holes 50, here shown as four in number. The cutting or scarfing oxygen issues from the hole 48 while the mixed fuel gas issues from the holes 50. Any number of peripheral holes 50, from one up, may be used as needed. Usually there will be two or more holes and they will be angularly spaced at equal intervals around the circumference of the flame end.

The shell 54 of the member 22, exclusive of the socket portion, may be formed from extruded tubing of cross section such as shown in FIG. 5, having a central hole 56 and a plurality of axial interior grooves 58 spaced about the inner circumference of the hole 56. A suitable length of tube is cut off and machined as shown in FIGS. 6 and 7, with a tapered portion 60 at one end and a circumferential groove 62 near the other end, the latter groove to accommodate a solder ring, e.g., a ring of silver solder. A slight countersink 64 is also made at the large end to provide an annular passage 66 (FIG. 1) when the parts 20 and 22 are abutted together in use. An insert 68, preferably formed of standard tubing, and given a screw thread 70 over its lower portion, is fitted snugly into the hole 56 in the body 54, as may be seen from FIG. 4. In assembling the shell 54 and insert 68 preparatory to fashioning the flame end part 22, the upper end surface 73 of the shell 54 and the upper end surface 75 of the insert 68 are placed in a common plane.

With the shell and insert so assembled, swaging mandrels are inserted through the grooves 58 so as to extend downward beyond the bottom of the insert 68. Another swaging mandrel is preferably inserted through the hole 72 in the insert. All of the mandrels may have any desired tapers, becoming of smaller diameter at the bottom end. Suitable stops may be provided to hold the shell and insert in the assembled position. A swaging operation is then performed upon the bottom portion of the shell 54 including the tapered portion 60 to close the metal of the shell and of the insert about the mandrels at the discharge end of the flame tip part and to force the metal of the screw threaded portion 70 to interlock with the metal of the shell 54. Thus, the discharge holes 48 and 50 are formed to desired finished diameters and desired tapers, and the shell and insert are fastened together. The mandrels are withdrawn from the rear (upper) end of the insert 68 after swaging.

The relative amounts of metal in the shell and insert as determined by the taper of the surface 60 may be preadjusted to make the shell and insert flow at the same linear rate during the swaging, so that the two parts come out to a flush common surface at the bottom end after the swaging operation, or alternatively, the bottom end of the flame tip part can be ground or machined to a flat surface after the swaging.

The swaging operation results in the lower portion of the passage through the groove 58 being formed into a gastight conduit that is restricted in diameter with respect to the unmodified groove. By choice of suitable finished diameter and taper in the gastight portion, the desired flow rate of the gas through the flame tip is brought under precise control. Gastight sealing of the remainder of the length of the groove 58 at the surface of the insert 68 is not essential.

After swaging, the seat (upper) end of the insert 68 may be struck with a conical punch, forcing the circumference of the insert 68 outward and slightly into the countersink portion 64 of the shell 54 as shown in FIG. 12. This secures the insert 68 from moving forward (downward) upon application of seating pressure. A portion of the countersink 64 remains open, furnishing an annular expansion space.

To form the socket 26, a separate seat socket member 90 (FIGS. 9—11) may be provided which fits over the seat end of the shell 54 and has a stop 92 for longitudinal positioning of the shell in the socket member. The member 90 may be relatively thin-walled and made of stainless steel for strength.

In applying the seat socket 90 to the shell 54, a solder ring is placed in the annular groove 62, and the desired angular position of the keying flats 25 relative to the hole pattern of the shell 54 is obtained by accurately orienting the socket member 90 radially on the shell. The socket member 90 is then soldered to the shell 54 by application of heat to the parts in known manner.

Alternatively, annular grooves 98 may be made in the outer surface of the shell 54 in position to be covered by the socket member 90 (FIG. 12). After adjusting the relative angular position of the member 90 and the shell 54 as above described, a portion of the socket member 90 may then be die-formed into the grooves 98, locking the socket member and the shell together.

Instead of forming the axial grooves 58 in the interior of the shell 54, as shown in FIG. 5, similar grooves may be formed in the exterior surface of the insert. Also, the socket 26 may be die-formed in the shell member instead of providing a separate socket member 90.

FIGS. 13 and 14 show a shell member 100 with an integrally formed socket having flats 25, and having a central axial hole 102.

FIGS. 15 and 16 show an insert 103 with exteriorly machined axial grooves 104, a central axial hole 106, and annular grooves 108. The grooves 108 serve a purpose like that of the screw thread 70 in insert 68 to effect interlocking of metal of the shell and insert during the swaging operation so that the two parts are securely fastened together.

The angular relationship between the hole pattern of the insert 103 and the circumferential position of the flat 25 in the shell 100 is determined by placing the insert and shell in desired angular relationship before swaging.

In general, in any of the embodiments illustrated, it will usually be desired to align the holes in the mixing part 20 with the holes in the tip part 22. However, in some cases some other angular relationship between the hole patterns may be found desirable, for example, when the number of holes is not the same in both parts. In any case, the placement of the flats 24 and 25 in the respective members will determine the angular relationship between the hole patterns when the torch tip is in use.

A step 110 down from the upper end of the insert 103 provides an annular passage in the finished flame end part which interconnects the fuel gas passages and allows a certain amount of expansion space for the fuel gas passing from the mixer 20 to the flame end 22, similar to the effect of the countersink 64 in the shell 54.

The shell and insert in the various forms illustrated herein may be made of any suitable metals, e.g., copper, bronze, etc. and can be of different materials if desired.

It will be evident that registering axial grooves in both the shell and the insert may be employed in place of grooves confined to either the shell or the insert as illustrated herein.

While illustrative forms of apparatus and methods in accordance with the invention have been described and shown herein, it will be understood that numerous changes may be made without departing from the general principles and scope of the invention.

I claim:

1. A two-piece torch tip for a gas-fired torch, comprising, in combination, a gas mixer piece, a flame end piece, each said piece having a plurality of passages therethrough for gas, said passages having given relative angular positions in each piece so that the passages in one piece may be coaxially aligned with the passages in the other said piece by establishing the correct relative radial orientation of the two pieces along their common axis, and keying means comprised in the respective pieces to cooperate in establishing the said correct relative orientation between said pieces.

2. Apparatus in accordance with claim 1 in which the said passages have the same relative positions in both said pieces so that the passages in one piece may be coaxially aligned with the respective passages in the other piece by use of said keying means.

3. Apparatus in accordance with claim 1, in which said keying means comprises a noncircular cylindrical end portion on one of said pieces and in which the other said piece has a mating socket therein for receiving said end portion of the first said piece.

4. Apparatus in accordance with claim 3, in which said end portion of the first said piece is generally circular cylindrical in form with a flat surface portion.

5. Apparatus in accordance with claim 3, in which said socket is in the flame end piece.

6. Apparatus in accordance with claim 5, in which said socket is comprised in a third member attached to said flame end piece.

UNITED STATES PATENT OFFICE
CERTIFICATE OF CORRECTION

Patent No. 3,558,062         Dated January 26, 1971

Inventor(s) Robert O. See

It is certified that error appears in the above-identified patent and that said Letters Patent are hereby corrected as shown below:

Column 1, line 50,    change "that" to --the--

Column 2, line 32,    after the word "of" (first instance insert the words --the flame--

Column 2, line 73,    change "tip" to --top--

Column 3, line 12,    change "42" to --40--

Column 3, line 20,    after the word "while" insert the word --allowing--

Signed and sealed this 8th day of June 1971.

(SEAL)
Attest:

EDWARD M. FLETCHER, JR.
Attesting Officer

WILLIAM E. SCHUYLER, JR
Commissioner of Patents